Figure 1:
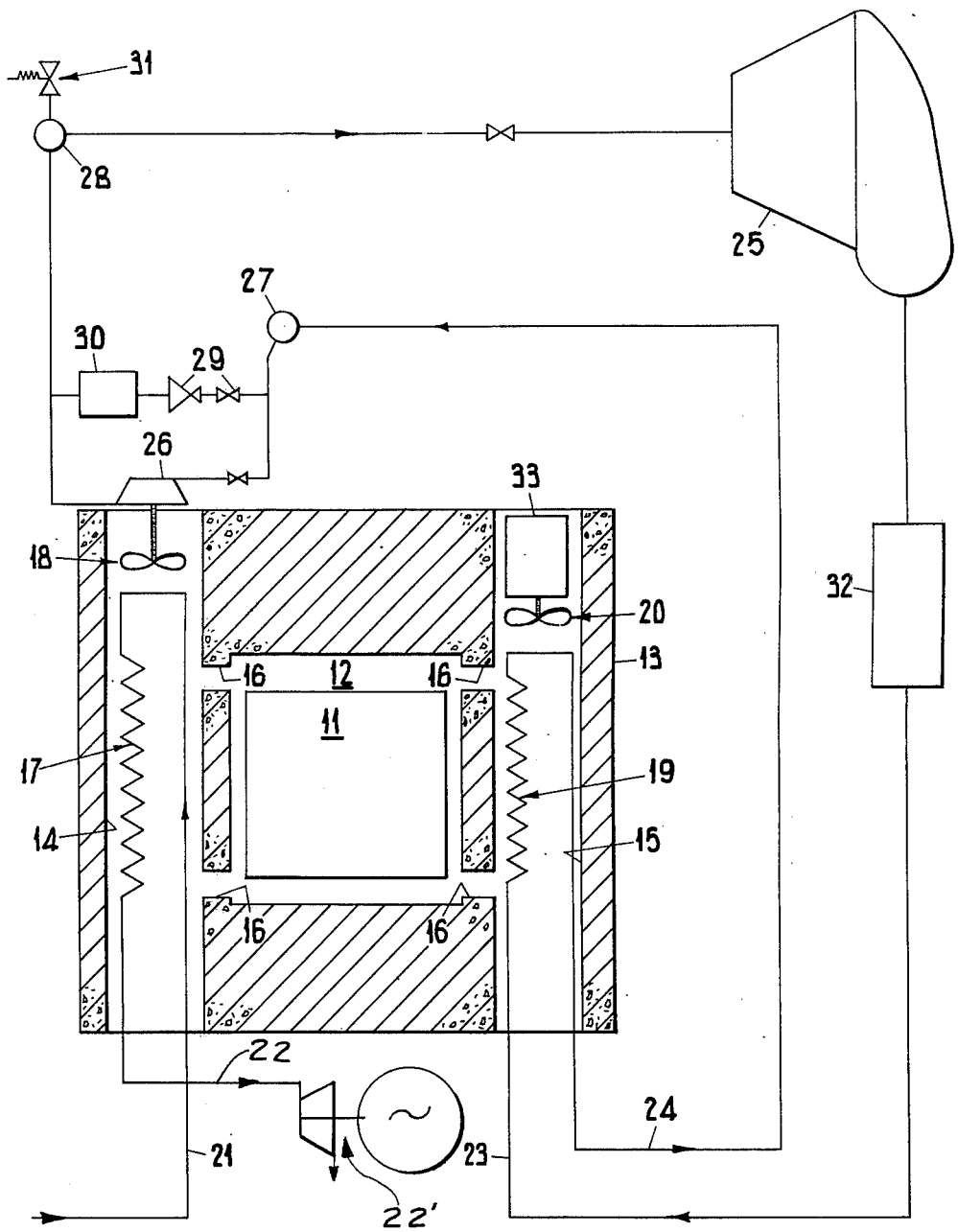

United States Patent [19]
George

[11] 3,937,652
[45] Feb. 10, 1976

[54] NUCLEAR POWER INSTALLATIONS

[75] Inventor: Brian Victor George, Willoughby Waterleys, England

[73] Assignee: British Nuclear Design & Construction Ltd., Leicester, England

[22] Filed: Apr. 12, 1973

[21] Appl. No.: 350,629

[30] Foreign Application Priority Data
Apr. 12, 1972 United Kingdom............... 16842/72

[52] U.S. Cl................................ 176/60; 176/65
[51] Int. Cl............................................ G21c 15/00
[58] Field of Search............ 176/60, 65, 55; 60/644; 8/DIG. 4

[56] References Cited
UNITED STATES PATENTS

| | | | |
|---|---|---|---|
| 2,957,815 | 10/1960 | Pacault et al. | 176/60 |
| 3,170,846 | 2/1965 | Blumberg, Jr. | 176/60 |
| 3,775,248 | 11/1973 | Charcharos | 176/60 |

FOREIGN PATENTS OR APPLICATIONS

| | | | |
|---|---|---|---|
| 1,489,955 | 5/1970 | Germany | 176/65 |

*Primary Examiner*—Samuel Feinberg
*Assistant Examiner*—C. T. Jordan
*Attorney, Agent, or Firm*—Kirschstein, Kirschstein, Ottinger & Frank

[57] ABSTRACT

In a nuclear power installation comprising a fluid-cooled nuclear reactor, main boilers and main coolant circulators driven by steam turbines to circulate coolant fluid through the reactor core and the main boilers, the circulator-driving steam turbines are driven by steam from auxiliary boilers which are also heated by the hot reactor coolant. This steam, after then being reheated by the hot reactor coolant if desired, may also then drive auxiliary steam turbogenerators provided additionally to main steam turbogenerators driven from the main boilers. Preferably the reactor core is housed in a thick-walled concrete pressure vessel having in its wall thickness first cavities which each house a main boiler and associated steam-turbine-driven coolant circulator and second cavities which each house an auxiliary boiler, an associated auxiliary coolant circulator and a reheater, if such are provided, for steam exhausted from the steam turbines driving the main coolant circulators.

6 Claims, 2 Drawing Figures

NUCLEAR POWER INSTALLATIONS

This invention relates to nuclear power installations, and more particularly such installations including a nuclear reactor in which the reactor core is cooled by a fluid such as carbon dioxide or helium which is circulated by one or more coolant fluid circulators.

In such an installation, it may be advantageous to drive the coolant circulators by means of steam turbines; and, in cases where the heat removed from the reactor core by the coolant is used to generate high-pressure steam in one or more main boilers which supply the steam to one or more main turbo-generators, it has been proposed to drive the coolant circulators by steam turbines supplied with steam from this main system, preferably from the cold reheat line thereof (i.e. at an intermediate stage in the main turbine expansion process) since this minimises the loss in thermodynamic efficiency. In cases of this kind, and in which steam reheat in the main steam system is effected within the reactor vessel by heat exchange with the hot coolant, the connection of the circulator turbines in the steam reheat line is quite convenient since this latter is returned to the reactor vessel (where the circulators are located) in any event. However, in a case where a steam-to-steam reheat cycle is used (i.e. in which either live or bled steam is used for reheat purposes), it would be expensive to return steam to the reactor merely for driving the coolant circulators.

According to the present invention, there is provided a nuclear power installation comprising a nuclear reactor which includes a reactor core, at least one main boiler, at least one main coolant circulator arranged to circulate coolant fluid through the core and through the main boiler, and a circulator-driving steam turbine arranged to drive said main coolant circulator, wherein the installation further comprises at least one auxiliary boiler which is arranged to be heated by the coolant fluid and to generate steam and which is connected to supply said steam to said circulator-driving steam turbine.

The invention may be incorporated in reactor systems such as are described and claimed in U.S. Ser. No. 178,525 filed on Aug. 30, 1971 and now abandoned comprising a main boiler system and an auxiliary boiler system both heated by heat transferred to them from the reactor core by fluid coolant circulated by coolant circulators, the auxiliaary boilers providing steam for essential electrical power and having a capacity, typically, of some 20% of the maximum station output.

Figure 2:
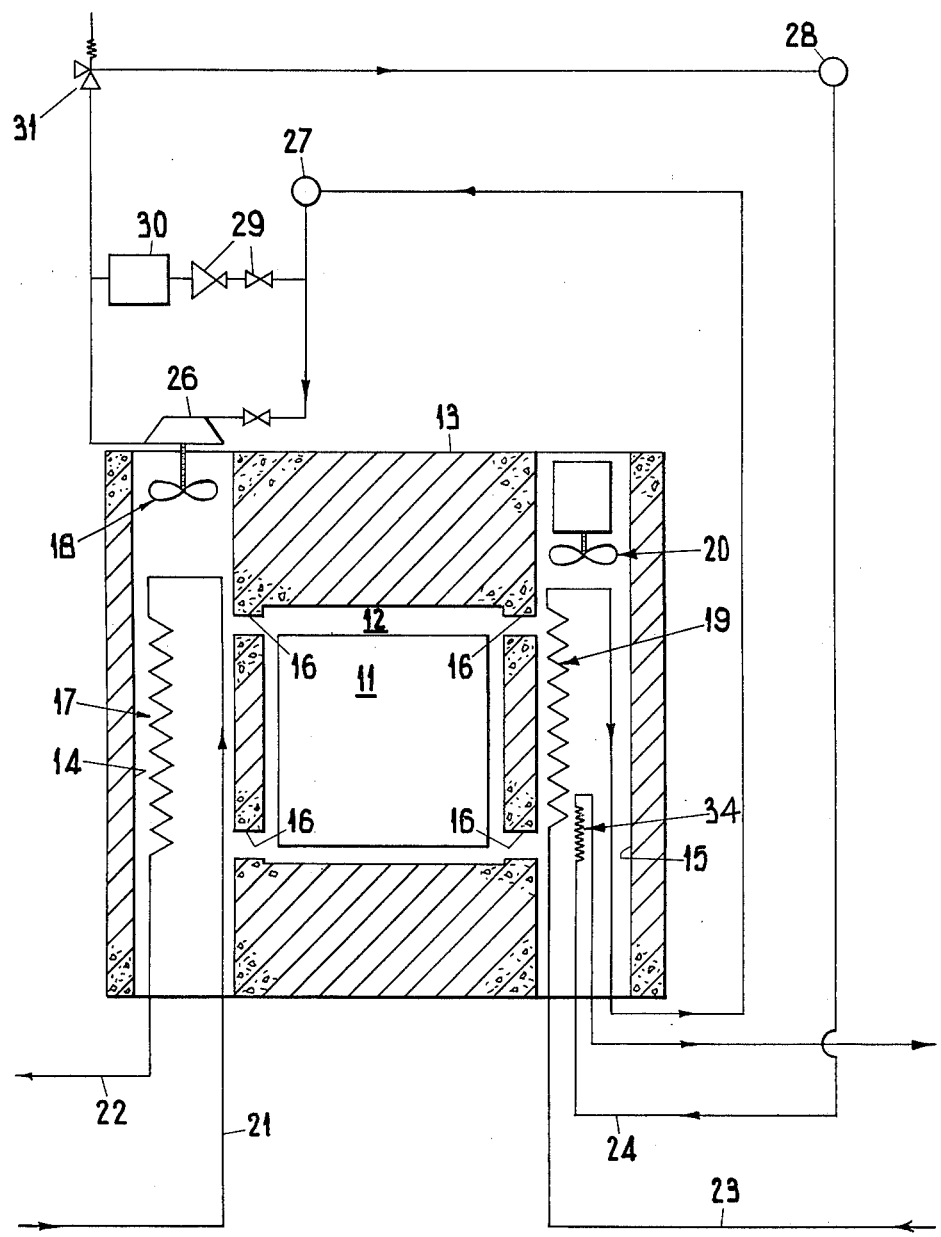

Embodiments of the present invention, incorporated in reactor systems in accordance with the said co-pending application, are described below, by way of illustration of the invention, with reference to the accompanying diagrammatic drawings in which:

FIG. 1 shows a first embodiment and
FIG. 2 shows a second embodiment, very similar to that shown in FIG. 1 but incorporating a modification.

In the embodiment of the invention shown in FIG. 1, a nuclear reactor core 11 is housed in a reactor chamber 12 within a prestressed concrete pressure vessel 13. Extending vertically within the wall thickness of the vessel 13 are provided chambers or cavities 14 and 15 which are sealed at their ends and are connected through ducts 16 to the reactor chamber 12. Within each of a plurality of the chambers 14 (say, four in number) is disposed a respective main boiler unit 17 and a respective main circulator unit 18 arranged to draw heated coolant fluid, say helium under pressure, from the reactor core 11 and thence through the respective main boiler unit 17 before returning it to the reactor chamber 12 for passage once more through the core 11. Similarly, a plurality of auxiliary boiler units 19 (which may also be four in number) are disposed each in a respective one of the chambers 15 which also accommodates a respective auxiliary circulator unit 20 which similarly draws heated coolant fluid from the reactor core 11 and thence through the respective auxiliary boiler unit 19 before returning it to the reactor chamber 12 for passage once more through the core 11. The detailed arrangement, including ducting to effect the desired circulation paths for the reactor coolant fluid, are described and shown in greater detail in our said co-pending application.

The main boiler units 17 are supplied with water through water feed lines 21, and their high-pressure steam outputs are supplied through steam lines 22 to one or more turbines of main steam turbogenerators 22' of the installation. Each chamber 14 which houses a main boiler unit 17 may also accommodate a respective steam reheater unit (not shown) for intermediate reheating of the steam supplied to the main turbogenerator turbines.

The auxiliary boiler units 19 are supplied with feed water through water feed lines 23, and their steam output is supplied through steam lines 24 to, eventually, the turbines 25 of one or more auxiliary steam turbogenerators which provide essential power for the operation of the installation. In accordance with the present invention, however, the steam from the auxiliary boiler units 19 is also employed to drive steam turbines 26 which drive the main coolant circulator units 18. The power requirements for the units 18 are only some 3% of the gross station output. In the embodiment of the invention shown in Fig. 1, this steam from the auxiliary boilers is fed by the steam lines 24 to a header 27, and thence to the turbines 26 from which it is exhausted to a further header 28 whence in turn it is fed to the auxiliary turbogenerator turbines 25. Each of the circulator-drive turbines 26 is provided with a respective steam bypass line shown as including pressure reducing valves 29 and an attemperator 30; and this provision, in conjunction with the normal throttle control (not shown) enables the flexible power requirements of the main circulators 18 to be met, including the provision of safety margins. Each turbine 26 may be directly coupled to the respective circulator 18, and, typically, may be a single-stage machine which runs at approximately 6000 revolutions per minute with inlet steam conditions 1500 psig/1000°F and exhaust conditions 650 psig/800°F.

A safety valve 31 may be provided at the header 28 as protection for the auxiliary steam system in the event of a trip of the main circulators 18, and a feed heater system 32 may be interposed between the exhausts from the turbines 25 of the auxiliary turbogenerators and the water feed lines 23. The auxiliary circulator units 20 may be driven by steam turbines supplied from the auxiliary boiler units 19, or (as shown) each may be driven by a respective electric motor 33 supplied by the auxiliary generator driven by the auxiliary turbines 25.

The embodiment of the invention shown in FIG. 2 is almost identical with that shown in FIG. 1, and corresponding parts are indicated by the same references in the two cases (except that no auxiliary turbine 25 is actually shown in FIG. 2). The difference between the two embodiments is that, in that shown in FIG. 2, the steam from the header 28 is reheated before being supplied to the auxiliary turbines 25, and for that purpose there is associated with each auxiliary boiler 19, in the same chamber 15, a respective reheater unit 34 through which steam passes on its way from the header 28 to the auxiliary turbines 25. This reheating provides a small increase in overall station efficiency.

The two embodiments of the invention described above are conceived as applied to a helium-cooled high-temperature gas-cooled reactor, but it will be understood that the invention may also find application in connection with the coolant circulators of other types of fluid-cooled reactors.

I claim:

1. A gas-cooled nuclear power installation comprising a nuclear reactor which includes a reactor core, at least one main boiler, at least one main coolant-gas circulator arranged to circulate coolant gas through the core and through the main boiler whereby to generate steam in the main boiler, a circulator-driving steam turbine arranged to drive said main coolant-gas circulator, and at least one main turbogenerator connected to be driven by steam generated in the main boiler, wherein the installation further comprises at least one auxiliary boiler, at least one auxiliary coolant-gas circulator arranged to circulate coolant gas through the core and the auxiliary boiler whereby to generate further steam in the auxiliary boiler and wherein the auxiliary boiler is connected to supply said further steam to said circulator-driving steam turbine.

2. A nuclear power installation as claimed in claim 1 and comprising at least one auxiliary steam turbogenerator connected to receive and be driven by said further steam exhausted from said circulator-driving steam turbine.

3. A nuclear power installation as claimed in claim 1 and comprising a plurality of main boilers, a plurality of main coolant-gas circulators each driven by a respective circulator-driving steam turbine and arranged to circulate coolant gas through the core and through a respective one of the main boilers, a plurality of auxiliary boilers each arranged to be heated by the coolant gas and to generate said further steam and connected to supply said further steam to at least one of the circulator-driving steam turbines, and a plurality of auxiliary coolant-gas circulators each arranged to circulate coolant gas through the core and through a respective one of the auxiliary boilers.

4. A nuclear power installation as claimed in claim 3 and comprising a prestressed concrete pressure vessel which contains the reactor core and the coolant gas and which includes a wall formed within its thickness with a plurality of cavities each communicating with the vessel interior, wherein each main boiler and its associated main coolant-gas circulator are housed in a respective one of said cavities and each auxiliary boiler and its associated auxiliary coolant-gas circulator are housed in a respective other one of said cavities.

5. A nuclear power installation comprising a nuclear reactor which includes a reactor core, at least one main boiler, at least one main coolant circulator arranged to circulate coolant fluid through the core and through the main boiler, and a circulator-driving steam turbine arranged to drive the main coolant circulator, wherein the installation further comprises at least one auxiliary boiler, which is arranged to be heated by the coolant fluid and to generate steam and which is connected to supply said steam to said circulator-driving steam turbine, at least one auxiliary steam turbogenerator connected to receive and be driven by steam exhausted from said circulator-driving steam turbine, and at least one steam reheater arranged to be heated by the reactor coolant fluid and interposed between said circulator-driving steam turbine and said auxiliary turbogenerator to receive steam exhausted from said circulator-driving steam turbine and, after reheating such steam, to feed it to the auxiliary turbogenerator.

6. A nuclear power installation comprising a nuclear reactor which includes a reactor core, a prestressed concrete pressure vessel which contains the reactor core and coolant fluid therefor and which includes a wall formed within its thickness with a plurality of first cavities and a plurality of second cavities each communicating with the vessel interior, a plurality of main boilers each housed in a respective one of said first cavities, a plurality of main coolant circulators each housed in a respective one of said first cavities and arranged to circulate coolant fluid through the respective main boiler therein and through the reactor core, a plurality of circulator-driving steam turbines each arranged to drive a respective one of the main coolant circulators, a plurality of auxiliary boilers each housed in a respective one of said second cavities and each arranged to be heated by the coolant fluid and to generate steam and connected to supply said steam to at least one of the circulator-driving steam turbines, a plurality of auxiliary coolant circulators each housed in a respective one of said second cavities and arranged to circulate coolant fluid through the respective auxiliary boiler therein and through the reactor core, and a plurality of steam reheaters each housed in a respective one of said second cavities and each connected to receive steam exhausted from at least one of the circulator-driving steam turbines.

* * * * *